Jan. 10, 1950   D. F. SWANSON   2,493,932
COFFEE MAKING APPARATUS AND AUTOMATIC
CONTROL MEANS THEREFOR
Filed Nov. 3, 1944   4 Sheets-Sheet 2
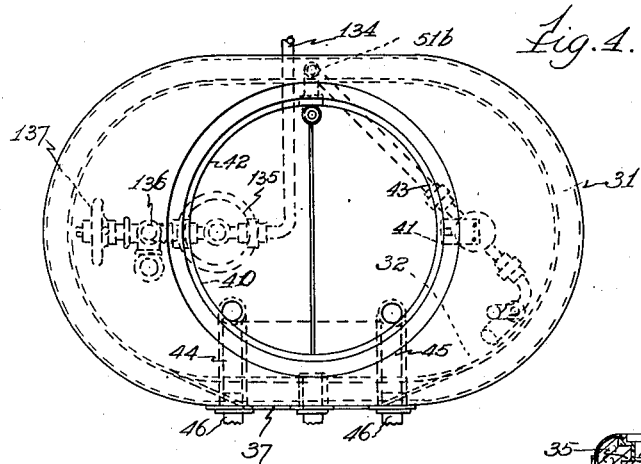
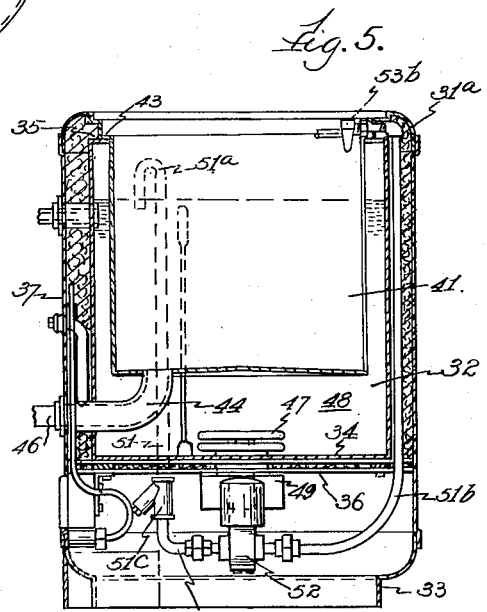
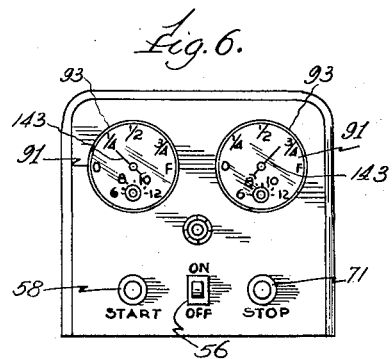
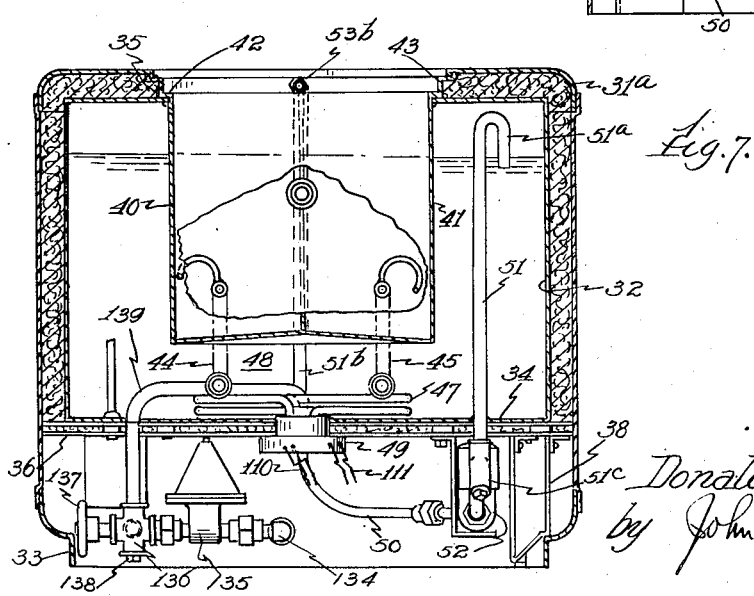
Inventor:
Donald F. Swanson
by John F. Brezina
Attorney.

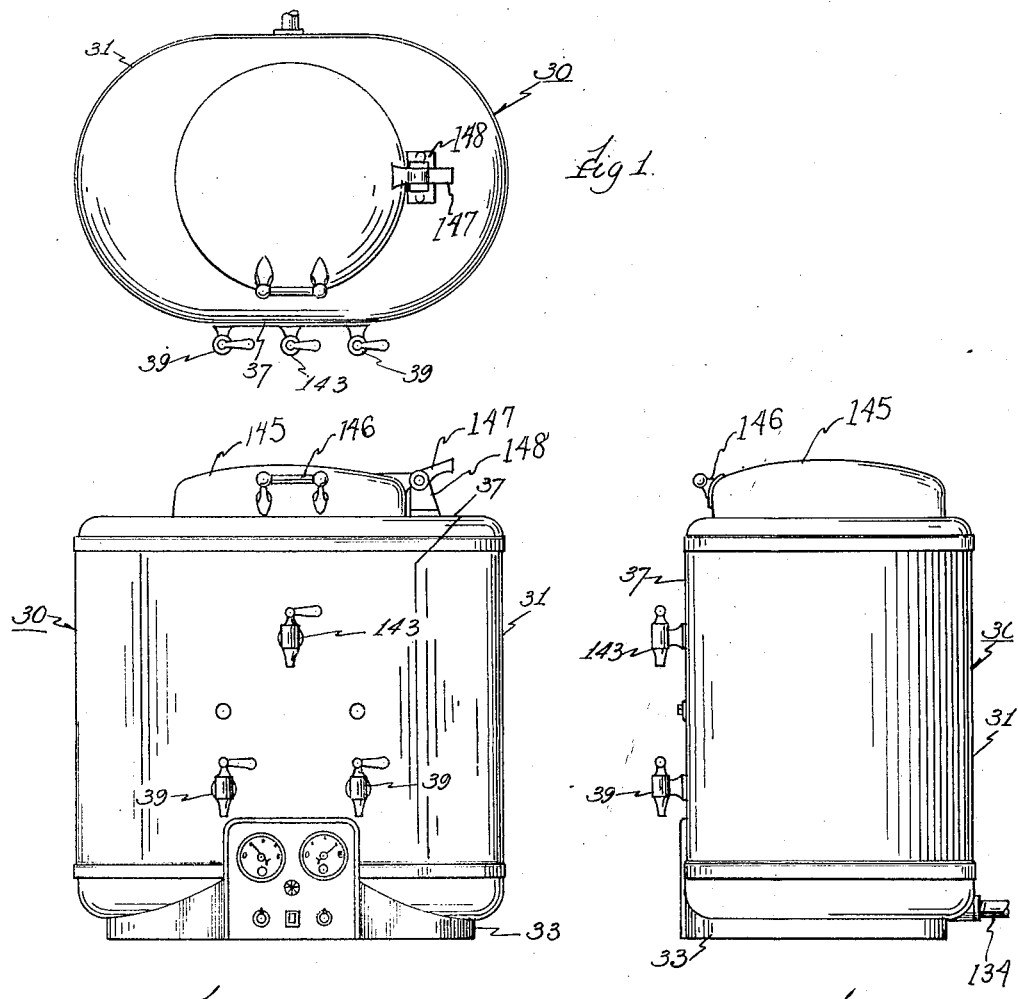

Inventor:
Donald F. Swanson
by John F Brezina
his Attorney

Jan. 10, 1950  D. F. SWANSON  2,493,932
COFFEE MAKING APPARATUS AND AUTOMATIC
CONTROL MEANS THEREFOR
Filed Nov. 3, 1944  4 Sheets-Sheet 4
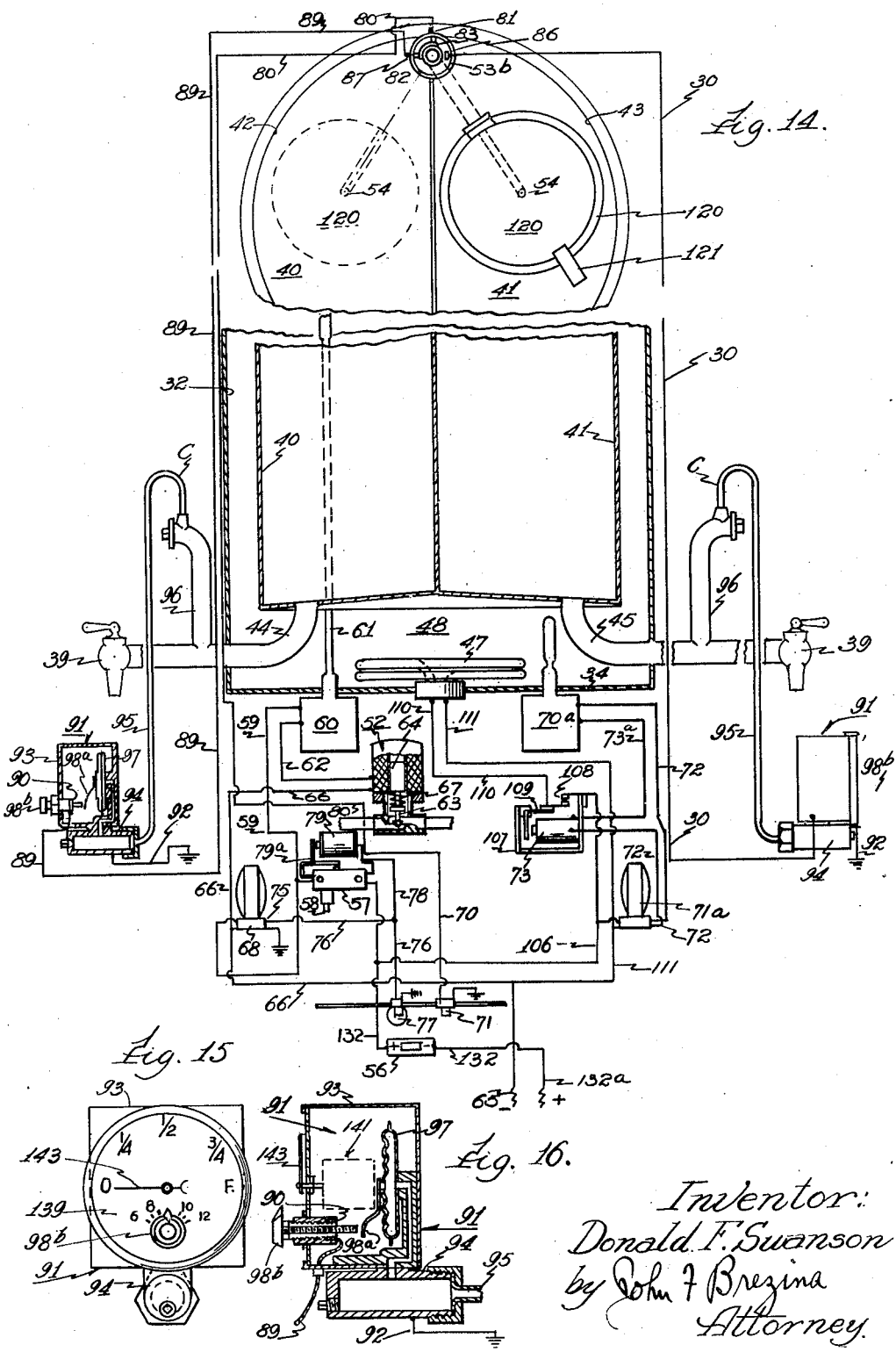
Inventor:
Donald F. Swanson
by John F. Brezina
Attorney Patented Jan. 10, 1950

2,493,932

UNITED STATES PATENT OFFICE 2,493,932

COFFEE-MAKING APPARATUS AND AUTOMATIC CONTROL MEANS THEREFOR

Donald F. Swanson, Chicago, Ill.

Application November 3, 1944, Serial No. 561,782

5 Claims. (Cl. 99—282)

This invention is directed to improvements in a novel coffee-making apparatus commonly known as coffee urns of the industrial type. More particularly my invention is directed to a novel combination and arrangement of parts in a coffee-making apparatus wherein a pre-determined and desired volume of water of a sufficiently high temperature will be measured and selectively forced thru a closed path to a swivelly-mounted spray head and only under selected pre-determined conditions of temperature.

An important object of my invention is the provision of automatic means and mechanism in a coffee making apparatus for measuring the desired volume of hot water and for forcing such pre-determined volume of sufficiently hot water from the heating tank to the spray head only if the water is heated to desired temperature, from where it drops down into and thru the ground coffee into the finished coffee compartment or compartments.

A further object of my invention is the provision of a coffee making apparatus having an outer water heating tank communicatively connected thru a series of pipes with the spray head above the coffee-making receptacle or compartment, and which apparatus has operatively connected thereto one or more electrically responsive devices which control the periodical or intermittent introduction of sufficiently hot water into the spray head and ultimately into the coffee-making compartment.

An important object of my invention is the provision of a water or liquid pressure responsive device operatively connected to the coffee compartments of urns or the like which devices in turn are operatively connected to an electrical switch which is connected to selectively and automatially open and close a flow control valve which is adapted to admit a pre-determined volume of hot water from the hot water reservoir of the urn through the spray head and into the finished coffee compartment. A further object and accomplishment of my invention is the provision of the aforesaid pressure-responsive device operatively connected to an electrically energized flow control valve which, when the coffee is substantially withdrawn from the liquid coffee compartment, will permit manual actuation of a starting switch to cause an actuation and opening of said flow control valve to cause the same to remain open a sufficient time to admit a predetermined amount of water into the liquid coffee compartment.

A further object and accomplishment of my invention is the provision of the coffee making apparatus including an inner coffee making compartment or receptacle contained within an outer hot water tank and circuitous pipes through which the hot water may be passed by pressure of the cold water supply source, said hot water being delivered through the spray head to drop into the finished coffee compartment, and in which an electrically operable flow control valve is connected in circuit with a pressure-responsive device which is communicatively connected to the liquid coffee compartment so that upon lowering of the level of the liquid coffee to a pre-determined point the manual actuation of a starting switch will close the solenoid valve circuit to cause an opening of said electrically actuated flow control valve to thereby cause hot water to flow from the hot water reservoir of the unit through the spray head and into either the liquid coffee compartment, and further to provide means which, when the water in the tank reaches a selected volume (according to manual adjustment), the pressure-responsive device will close and energize a reset coil which in turn operates the reset means to open a micro switch to thereby open the circuit of said solenoid valve to cause spring-impelled closing of said flow control valve.

A further object and accomplishment of my invention is a provision of an economically manufacturable coffee-making apparatus of the aforesaid type which includes automatically operable hot water feed controls and a pressure-responsive circuit control device which is connected in circuit with the electrically operated flow control valve, and which is adapted to effect a flow of hot water from the hot water reservoir into the coffee making compartment and to thereby permit and assure the correct making or brewing of coffee by unskilled employees having little or no experience in coffee making, and to make it impossible for such employees to admit insufficiently hot water or an improper quantity of water into the coffee making compartment.

Other and further objects of my invention will be apparent from the following description and appended claims.

On the drawings:

Fig. 1 is a top plan view of my coffee making apparatus.

Fig. 2 is a front elevation thereof.

Fig. 3 is a side elevational view thereof.

Fig. 4 is a cross sectional view taken on a horizontal plane at the top of the said automatic coffee making apparatus.

Fig. 5 is a side sectional view taken on a vertical plane through the apparatus.

Fig. 6 is an enlarged elevation of the indicating panel shown at the lower left of Fig. 5 and illustrating the control and meter thereon.

Fig. 7 is a front sectional view thereof with the walls and other parts shown in cross section.

Fig. 14 is a partially side elevational view and a diagrammatic view illustrating the wiring and circuit connections to the various parts.

Fig. 15 is an enlarged front elevation of the dial or face upon the pressure gauge or circuit control device, one of which is illustrated in Fig. 14 at each side of the automatic coffee making apparatus.

Fig. 16 is an enlarged cross sectional view of the liquid-responsive pressure device which is adapted to open and close a circuit as hereinafter more fully described.

Figure 8:
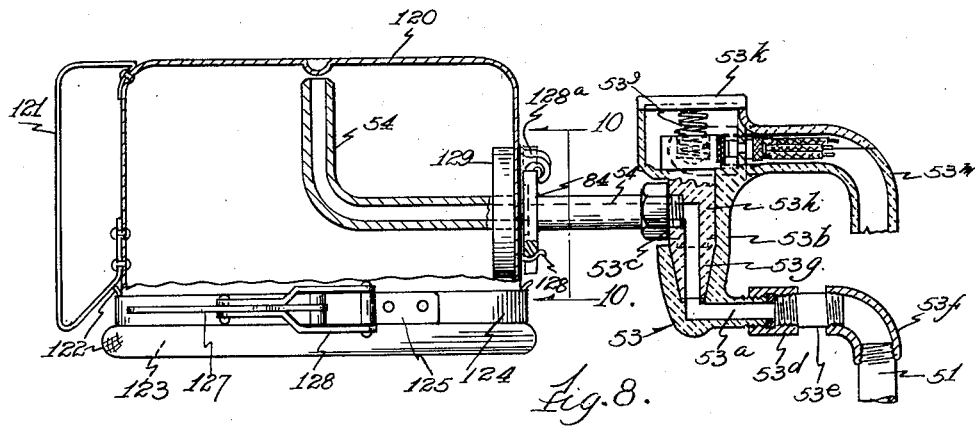
Fig. 8 is an enlarged vertical cross sectional view of the removably mounted hood or cover together with the upper portion of the hot water delivery pipe.

Referring to the drawings, the main body of the urn or coffee making apparatus is composed of a shell or casing 30 of substantial oval cross section as illustrated in the drawings. This shell or casing is composed of the outer metal wall 31, illustrated as being of oval cross section. Numeral 32 designates a tank or reservoir within the upper part of the casing 30, whose side wall is spaced from wall 31 to provide intervening intermediate insulating space or spaces wherein suitable insulating material may be placed if desired. The outer wall 31 extends downwardly and is joined by welding or the like to the upper edge portion of an oval shaped base 33, whose downwardly extending flange is adapted to engage the supporting surface as illustrated.

The side wall of the reservoir 32 extends only part of the way downward wherein it merges into a substantially flat metal bottom designated as 34. The uppermost portions of said wall 31 extend horizontally to form the top portion 31—a as indicated, which extend inwardly and are joined together by welding or the like to form a substantially annular or circular upwardly facing shoulder or seat designated as 35, which is adapted to receive and form a seal for the removable cover hereinafter defined.

Reference numeral 36 designates an optional lower transverse and horizontal metal wall which is mounted and secured immediately below the bottom 34 and spaced therefrom to provide an insulating space, the said panel together with said bottom 34 forming a double wall unit having a central opening therein through which connections a heater unit extends as hereinafter described.

Referring to Fig. 7, numeral 38 designates one of a plurality of optional spaced apart bracket-like substantially U-shaped legs or supports, each of which is secured or connected at its upper end to the bottom wall 36. Said auxiliary legs or supports 38 rest on the supporting surface and aid the base 33 in supporting the entire apparatus.

Numerals 40 and 41 desginate two metal compartments, receptacles or tanks which may be economically formed from a single cylindrical tank by mounting a diametrical partition wall therein, to thereby form semi-cylindrical tanks, as shown in Fig. 7. Numerals 42 and 43 designate integral horizontally bent edge flanges on the upper edges of said tanks 40 and 41.

Numerals 44 and 45 designate elbow-like outlet pipes which are connected to the bottom walls of tanks 40 and 41 respectively, and which extend horizontally through suitable openings in the front wall 37 and have mounted on their outer ends suitable hand operated faucets 39 of any conventional construction and through which the brewed coffee is drawn as desired.

As shown in Figs. 5 and 7, a heater 47 is mounted to heat the water in the hot water compartment 48 defined by reservoir 32. Said heater may optionally be either below the bottom 34 to heat the water in the reservoir by conduction through the bottom, or may be above said bottom, particularly where electrical immersion type heaters are utilized and which I have illustrated. The immersion type heater 47 is mounted in a removably secured member 49, which seals the opening in the bottom wall 34, 36 and through which suitable circuit wires extend to connect with circuit wires 110, 111 hereinafter described. Said tanks 40 and 41 may be mounted to be quickly and easily removed by lifting the same out for sanitary and cleansing purposes, though after disconnecting the outflow pipes 45 and 44 to permit their simultaneous withdrawal.

It is to be understood that the heater is connected by suitable circuit wires to a manual control switch as well as provided within said circuit with a thermostat. Such circuit is described beginning at page 16 hereof.

As shown in Fig. 7, numeral 134 designates an inlet pipe connected to a water supply under pressure which is connected by a union to manually adjustable pressure valve 135 of conventional construction. Valve housing 136, provided with a conventional valve thereon, has a handle 137 connected to the outlet side of pressure valve 135 by suitable fittings as shown in Fig. 7. Valve housing 136 has a downwardly extending drain opening therein normally closed by removable plug 138. The upper side outlet of said valve housing has connected to it a curved pipe 139 which passes through the bottom of the reservoir 48, at which point it is sealed, and thence it extends horizontally to terminate at points substantially in the center of the heater 47, as shown in Fig. 7, so that the cold feed water is discharged adjacent said heater in order to provide efficient convection. Valve 136 with its removable plug permits draining of the reservoir periodically to the level of the upper part of pipe 139.

Referring to Figs. 5 and 7 numeral 50 designates a conduit or pipe connected to the upwardly extending pipe 51 in reservoir 48 whose upper goose neck 51—a terminates a short distance below the upper rim of said reservoir. Said flow conduit 50 has interposed therein the body portion of a solenoid actuated flow-control valve 52 and thence continues horizontally through pipe 51—b and thence upwardly into the connecting fittings of the housing 53—b of a swivel sprayhead mounting member or element 53 and through the angular passage therethrough designated as 53—a, as shown in the cross sectional view of Fig. 8.

As shown in Figs. 1, 2 and 3, numeral 145 designates a dome-like metal cover having a suitable handle 146 and pivotally mounted to the top wall of the urn unit by means of a projecting metal arm or lever 147, which is pivoted to a suitable apertured bracket 148 substantially as illustrated. The periphery of said cover is adapted to seat, when the same is closed, in the annular recess or shoulder 43, shown in cross section in Figs. 5 and 7 at the upper edge of the coffee tanks.

Pipe 51 has a Y coupling 51—c mounted thereon which has threaded in one portion thereof a clean-out plug as shown.

Referring to Fig. 8, numeral 54 designates an angular upturned delivery pipe, sprayhead, or nozzle which has one end threaded into a threaded opening in the housing 53—b, as illustrated at 53—c in Fig. 8, and thereby communicating said sprayhead or nozzle 54 to pipe or conduit 50. Numerals 53—d, 53—e and 53—f designate conventional fittings, (a coupling, nipple and elbow respectively) which connect the end of pipe 51 to the lower nipple portion of housing 53—b, as shown in Fig. 8.

The housing 53—b defines a cone-shaped compartment therein, in the lower part of which is mounted a conical passaged plug 53—g, whose upper flanged end is slidably engaged by the lower interfitting part of a passaged pin 53—h. The housing 53—b has a removable cover 53—k, which has mounted between it and the pin 53—h an expansion spring 53—l which maintans a water-tight seal between the lower end of pin 53—h and plug 53—g.

As shown in Fig. 8, 53—m designates a branch conduit which communicates with the interior of said housing 53—b, and which contains the circuit wires to the selector two-way switch in said housing and hereinafter described.

The said swivel unit provides for horizontally swinging the hot delivery pipe or sprayhead over either one of two adjacent coffee brewing tanks as illustrated.

Figures 9, 10:
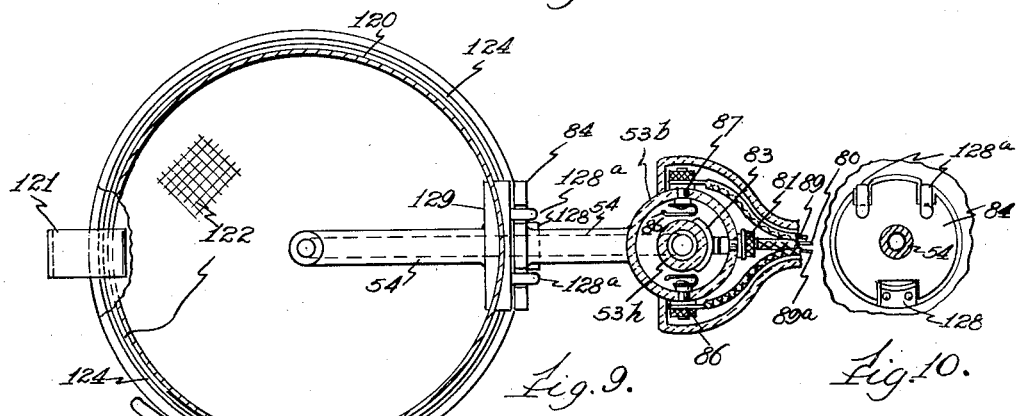
Fig. 9 is a top plan view of the hood or cover, and of pipe connections shown in Fig. 8.
Fig. 10 is an enlarged cross sectional view taken on line 10—10 of Fig. 8.

As shown in Figs. 8 and 9, the upper compartment of housing 53—b contains three spaced apart circuit terminal connections 87, 81, 86 mounted in the housing wall and insulated therefrom, and which are shown in Fig. 9 as approximately ninety degrees apart. A metal arcuate switch plate 83 is secured with separating insulation (not shown), on and partially rotates with the pin 53—h so that said plate contacts two of said terminals together when the pipe is in position over either of the coffee brewing tanks.

Referring to Fig. 8, reference numeral 120 designates a substantially cylindrical inverted cover or hood 120 preferably made of metal. Reference numeral 121 designates a metal bracket-like handle, which has its opposite ends bent as illustrated in Fig. 8, and which is riveted or equivalently attached.

Figures 11, 13:
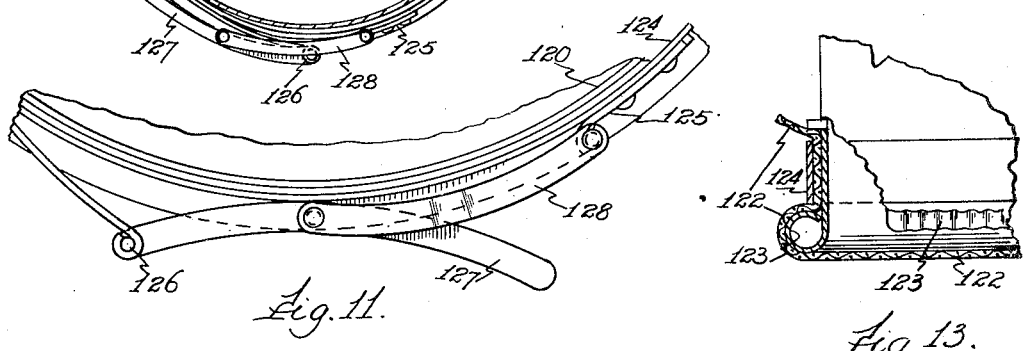
Fig. 11 is an enlarged view of a portion of a locking device adapted to releasably mount the ground coffee bag or strainer inside the urn.
Fig. 13 is an enlarged fragmentary and cross sectional view illustrating the lower portion of the hood together with a segment of a fabric strainer or bag, and with a locking device such as shown in Figs. 11 and 12 shown in cross section.

Reference numeral 122 designates a removable fabric shown in cross section in Fig. 13, which is preferably in the form of a bag and which is adapted to be removably suspended or mounted over the annular bead 123 and held in such position as long as desired by a releasable locking clamp or ring 124 which is adapted to envelope and hold the edge portion of the bag immediately above the bead 123.

Figure 12:
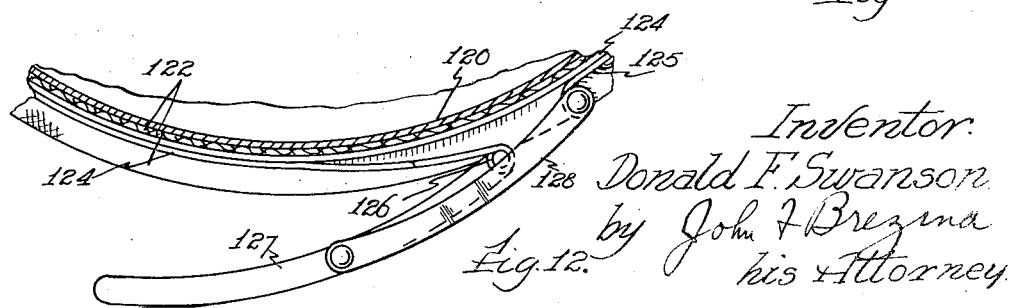
Fig. 12 is an enlarged view of a segment of said releasable locking device in closed position.

The locking ring 124 has its ends normally spaced apart, as indicated in the fragmentary view of Figs. 11 and 12, one of said ends having an anchoring bracket 125 thereon, and the other of said ends having doubled-back hook-like end 126 on which end a removable arm or lever 127 is pivotally connected by a suitable rivet, pin or the like. The metal connecting link 128 has one end pivotally connected to intermediate portions of the lever or arm 127, as indicated at Fig. 12, and its other end is bent and anchored to the bracket 125 by a pin or the like. When the lever is extended outwardly the same is mounted about the fabric strainer and then said lever 127 is swung against the said anchoring and locking strap, thereby causing said locking strap 124 to impinge and clamp against the edge portion of the fabric receptacle or strainer 122 against the hood 120. When it is desired to remove the strainer 122 for cleaning and replacement of ground coffee, the locking ring 124 is removed in the manner before described, and either a new or the same strainer may be replaced, and coffee grounds of the desired quantity are placed thereon.

Referring again to Fig. 8, numeral 128—a designates a pair of spaced apart hooks opening downwardly which are secured on the side surface of the hood 120 in any suitable manner, as for example by screws or rivets (not shown), which pass through the hood side wall. A centrally passaged plate or block 129 is secured by welding or the like to the inside of said hood, as shown in Figs. 8 and 9.

A yieldable clip 128 is mounted on hood 120 and cooperates with hooks 128—a to releasably mount nozzle pipe 54 with respect to said hood. A collar 84 is secured about nozzle pipe 54 in a position so that its periphery may be slipped under and releasably engage hooks 128—a and clip 128, as shown in Fig. 8.

Said reinforcing block 129 is secured by welding or the like on the inside wall of the hood 120 and provides reinforcing and securing means surrounding the opening in said hood through which the nozzle pipe 54 passes, the said block preventing buckling or distortion of the side wall of said hood 120 when the hood is moved or removed entirely from said spray nozzle 84 and pipe 54.

*Description of 110 volt circuit controlling flow control valve and other parts*

Referring to the diagrammatic view of Fig. 14, I will first describe the 110 volt circuit which connects the power source with a 110 volt micro switch 130 and the electrically actuated flow control valve, and in which circuit a temperature responsive electrically actuable "make-and-break" switch 60 is mounted.

Starting at the positive terminal 132a of the power source indicated at the lower part of the figure, a manually operable toggle switch 56 is connected in said positive circuit wire 132 which wire then leads to one terminal of a micro switch of conventional construction designated as 57. A starting push button switch 58 is operatively connected to said micro switch 57 as illustrated diagrammatically in Fig. 14. The circuit then continues through the circuit wire designated as 59 to the thermostatically controlled "make-and-break" switch device designated as 60.

The thermostatically controlled switch 60 is provided with a conventional form of "make-and-break" movable contact (not shown), and with a thermometer 61 which extends upwardly into the reservoir as shown in Fig. 14. The point at which said thermometer 61 passes through a passage in the bottom of tank 40 is suitably sealed in a conventional manner.

The circuit then continues from the thermostatically controlled device 60 to circuit wire designated as 62 to one terminal of the solenoid of the solenoid-actuated flow control valve designated generally as 52. The movable element 63 is operatively connected to a suitable solenoid 64 and a slidable retractable bar which is connected to the movable valve element 63 and which is shown in partial cross section in Fig. 14, and a spring 67 normally holds valve element 63 in closed position when said solenoid is not energized.

The circuit continues from one terminal of said solenoid of said control valve 52 through wire 66, through transformer 68 and thence to the ground as indicated in Fig. 14. Wire 66 continues also to the negative side of the power source whose terminal is designated as 65.

*Description of 10 volt circuit connecting the lamp or signal light and transformer*

Referring to Fig. 14, starting at the right hand terminal of the transformer 75, circuit wire 76 connects one terminal thereof with a signal lamp 77, which is mounted in a convenient viewable position on the front panel of the device and as hereinafter described.

Circuit wire 78 connects circuit wire 76 to the low voltage electric coil 79 and to one terminal of the micro switch 57. Circuit wire 70 connects manual stop switch 71 to the right hand terminal of coil 79. Circuit wire 80 connects the same terminal of coil 79 and wire 78 to one spring-containing terminal 81 of a two-way switch 82 which is mounted adjacent and within the casing 53—b of the swivel member generally herein described, which aids in supporting the swingably mounted hood 120 which is adapted to be moved from position above one of the tanks 40 to above the other tank 41 and vice versa, depending upon into which of the two said tanks the hot water is to be delivered.

As shown in detail in Fig. 9, the switch 82 is provided with a terminal 86 which is mounted substantially diametrically opposite another contact terminal 87 as shown at the left in Fig. 9. A metal arcuate contact plate or member 83, which is suitably secured on the interior surface of the casing 53—b of said swivel member, is adapted to contact two of said three terminals together at a time, in other words either to contact central terminal 81 to terminal 87, or when the nozzle 85 and hood 120 are in the left hand position shown in Fig. 14, it will contact terminals 81 and 86.

When the spray nozzle 85 and hood 120 are in position illustrated in Fig. 14, the said terminal circuit will pass through and continue from terminal 81 through contact terminal 87 and then downwardly through circuit wire 89 to the metal terminal ring 90 of the adjustable liquid pressure-responsive control device and switch designated generally as 91, and one of which devices is shown in cross section in Fig. 16. A short circuit wire 92 connects the metal casing of said pressure-responsive switch device 91 to the ground, as indicated at the left and right of said Fig. 14.

Fig. 16 is an enlarged cross sectional view of the device generally designated by 91 which embodies a suitably disposed expandable diaphragm 97 which is responsive to the liquid pressure of the liquid body communicated therewith, (in this case the liquid coffee in the respective tanks). Said device 91 includes a manually adjustable make and break switch together with a face and dial 139 and indicator 140, which is shown in Fig. 15. Numeral 93 designates an enclosing shell or housing mounted on a suitable metal passaged fitting or member 94 which is communicated by a pipe 95, of relatively small dimension, to the upper end of an upwardly extending pipe 96, whose lower end is secured to the flow and outlet pipe 44 as illustrated in Fig. 14. The pipe 95 is preferably formed with an upwardly extending goose neck which extends above the upper end of the pipe 96 as shown. The upper end of pipe 96 is provided with a removable threaded plug or cap 96—a to permit a periodical cleaning thereof.

Numeral 97 designates a conventional form of annular expansable diaphragm which is mounted on and communicates with the upwardly extending passaged member 97—a and which communicates the interior of said expansable diaphragm 97 to the member 94, and pipes 95 and 96. It is to be understood that the liquid pressure within each of the said liquid coffee tanks is transmitted through the pipe 95, in which pipe 95 and member 94 a column of air is normally trapped, to thereby cause the forward face wall of said diaphragm to flex outwardly and to a variable and proportionate extent according to the pressure from the liquid coffee in the tank.

Numeral 98—a designates an offset contact strip which has one end secured to the center of said diaphragm and which is adapted to electrically connect said diaphragm and adjusting screw 98—b when said diaphragm flexes outwardly, to thereby electrically connect the circuit of wire 89 to the ground through wire 92.

Numeral 141 designates diagrammatically a suitable movement transmitting mechanism of conventional form which transmits the pressure-imparted expansion of said diaphragm to move the indicator hand 140 over the dial 139, said dial preferably having graduations and indicia thereon to correspond to the volume of water needed in the corresponding coffee tank to effect a closing of aforesaid circuit and consequent stoppage of hot water flow.

Circuit wire 89 extends from the ring terminal 90 of the adjusting screw 98b to the terminal 87 of the two-way switch 82. The screw 98 is adjustable toward and away from the diaphram 97 so that the electrical connection between the diaphram and screw may be made when there is a predetermined volume in the coffee tank, to close the circuit from wire 89 through wire 92 to the ground.

While I have described in a preferred form the movable element which responds to the pressure as a diaphragm, I desire it to be understood that equivalent movable members which are responsive to the rise of the liquid may be equivalently and satisfactorily utilized.

As shown in Fig. 15, an adjusting screw 98—b is provided with an optional indicator which is adapted to be moved to the desired degree and as indicated by the indicia "6, 8, 10, 12" on the face or dial of said device 91. The said indicia may be such as to correspond to the quantity of liquid in the tank so as to adjustably space the arm 98—a from the center portion of the diaphragm 97 so that the quantity of coffee in the tank, which will close the said circuit through arm 98—a, will be substantially indicated by said indicia.

The pressure responsive device shown at the right of Fig. 14 is of the same construction as has just been described and is similarly operatively connected to the right hand tank 41, though connected by wire 30 to terminal 86 of the upper two-way switch aforedescribed. The dial 91 of said right hand device is shown at the right of Fig. 6.

Numeral 143 designates a conventional drain valve which is mounted and sealed in the front wall 37 of reservoir to permit selective withdrawal of hot water therefrom, as shown in Figs. 2 and 3.

*Description of 110 volt circuit connecting power source and heater and 24 volt transformer*

Starting at the positive side of the power source designated by the circuit wire 132 from terminal 132—a and the toggle switch 56, a circuit wire 106 electrically connects said toggle switch 56 to one terminal of a power relay switch 108, which is a 110 volt unit. This circuit continues through the separable movable switch arm of switch 108, when the same are contacted together by angular pivoted arm 109 mounted on bracket 107 and connected to the frame of power relay 73. Then said circuit from wire 106 continues through the circuit wire 110 to the heater.

Said circuit then continues in its return through circuit wire 111 back to the negative side of the power source through wire 111, though being connected to the 24 volt transformer 71 shown on the lower right of Fig. 14.

*Description of low voltage circuit from transformer 71a and temperature controlled thermostat 70a*

As shown in Fig. 14, a wire 72 connects one terminal of the low voltage side of transformer 71a to the terminal of power relay 73 and passes through said power relay 73 through wire 73—a to and through inlet and outlet terminals of conventional thermostat 70a and through circuit wire 74 back to the other terminal of low voltage transformer 71a. The thermometer of said thermostat extends into the hot water reservoir and according to the selected adjusted setting of said thermostat, the decrease of temperature of the reservoir water below the desired and adjusted degree will cause said thermostat to close said circuit from wire 73—a to said wire 74 to thereby energize the power relay 73 to in turn operate switch arm or lever 109 and contact the arms or contact members 108 to thereby close the 110 volt aforedescribed circuit of the heater. When the heater has raised the temperature of the reservoir water, the thermostat will operate power relay 73 to separate switch arms 108 to open said 110 volt heater circuit.

Accordingly the power circuit to said heater is selectively controlled by the temperature of the reservoir water.

While I have described the foregoing circuit as a low voltage circuit, I desire it to be understood that any normally used voltages may be satisfactorily utilized.

When the said 10 volt circuit through the circuit wire 89, diaphragm 97, contact arm 98, etc., is closed and grounded as aforesaid, the switch operating coil 79 will be energized to thereby pivot and move the angular arm 79a of the aforesaid micro switch and to thereupon open said micro switch and thereby open the aforedescribed 110-volt circuit in which the solenoid of the flow control valve 52 is mounted. This will cut off the solenoid of said flow control valve 52 from its source of power and the spring 52—b (Fig. 14) will return said flow control valve to closed position to stop the flow of hot water from the reservoir 48 to and through the spray nozzle 85 from which it normally falls by gravity through the ground coffee on strainer 122 into said tanks 40 and 41 respectively.

It will be understood from the aforedescribed structural features, parts and circuits that whenever the power switch and the source of power is closed and that when the volume of coffee in either one or the other of tanks 40 and 41 falls below a desired volume, (it usually being allowed to become substantially empty before re-brewed coffee is allowed to fall into the tank) the operator, whether inexperienced or experienced, merely needs to depress the manually actuable switch 58 to close the 110 volt circuit to the solenoid valve 52 to thereby open said valve and permit the pressure head of the water supply to force the hot water through the flow pipe or conduit 52—a and through the said open flow control valve 52 into and through the perforated spray head from which it will drop by gravity upon and through the coffee grind which has been placed into the releasably mounted fabric receptacle or strainer 122 to then drip through the same and into the particular tank over which said strainer is positioned at the particular time. It is to be understood that the pressure of the cold water supply source maintains an air pressure head above the water in the reservoir.

However, an important feature of construction and operation of my said apparatus is that in spite of the manual actuation of the starting switch by either inexperienced or experienced employees, the power circuit to said solenoid valve 52 will not be closed unless the water in the hot water reservoir is sufficiently hot and of sufficiently high temperature to be usable for satisfactory brewing of coffee; this because the thermostat 60 will hold said solenoid valve circuit open if the water is not sufficiently hot and as adjusted and controlled by the said thermostat 60. This new and improved factor of operation eliminates the present troubles of presently known urns when the same are operated by inexperienced or careless employees.

A further important accomplishment of my invention is in the provision of a twin tank unit wherein two tanks are contained within the same hot water reservoir, and either of which tanks may be selectively utilized by themselves, or simultaneously, to brew the coffee in the aforedescribed manner, and to accord with the coffee volume requirements of the particular business or of the particular time of the day. For example, in non-busy periods of the day, the brewing can be carried on in only one of the said tanks merely by allowing the spray head 85 to be positioned over the tank desired, this without in any way affecting or disconnecting the other of said tanks and its associated parts from the apparatus as a whole.

A further novel accomplishment of the aforesaid construction is the provision of the pressure-responsive circuit control manually adjustable devices, each one of which are connected in circuit and with the aforedescribed parts, and each one of which are communicatively connected to its own coffee brewing tank so that the attainment of a predetermined pressure (as manually adjusted on said pressure-responsive devices) will cause an opening of the circuit to the solenoid operated flow control valve and thereby automatically stop the inflow of the water to and through the spray nozzle as aforesaid. Further, the provision of the separate circuit means and pressure-responsive gauges or devices for each tank provides completely independent and selective operation of either of said tanks, though employing and utilizing a common power source and single heater.

I desire it to be understood that while I have described a heater of the immersion type mounted within the body of water in the reservoir, that any other known type of electrically powered heater may be employed, either exterior of the reservoir or within the same. Gas heaters may also be satisfactorily employed in the usual manner to heat the water in the reservoir.

As many changes could be made in the above construction, and many apparently widely different embodiments of my invention, within the scope of the claims, constructed without departing from the spirit or scope thereof, it is intended that all matter contained in the accompanying specification shall be interpreted as illustrative and not in a limiting sense.

I claim:

1. In a coffee making apparatus including a hot water reservoir and a plurality of coffee brewing tanks, a pipe means for conveying water from the reservoir to the tanks including a single discharge end adapted to swing from above one of said tanks to any of the others, a solenoid operated valve in said pipe; pressure responsive operable mechanism including a pressure responsive diaphragm and a manually adjustable switch and relay operated mechanism adapted to open the circuit of the solenoid of said valve and including a second circuit connecting the coil of said relay operated mechanism and said adjustable switch, said diaphragm communicating with the interior of said tanks and operating to cause opening of the circuit of the solenoid of said valve when the pressure in the tank rises above a predetermined value, the pressure rise in the tanks causing said mechanism to de-energize the solenoid of said valve to close the pipe to a water flow from said reservoir.

2. In a coffee making machine in which water is heated in a reservoir and conduced through a pipe line for spraying over a batch of coffee into a tank; a normally closed solenoid operable valve in said pipe line; circuit means for the solenoid of said valve including a normally closed openable start switch having a circuit closing element; a pressure responsive means including a second switch and a pressure responsive diaphragm, said diaphragm being communicatively connected with the interior of said tank; second circuit means for said second switch; lever means movable by the energization of said second circuit means, said lever means being operatively connected to said first switch and being adapted to break an electric circuit in said first mentioned circuit means, the rise of pressure in the tank to a predetermined amount being adapted to cause said diaphragm to close said second switch to thereby cause energization of said second circuit and thereby move said lever to cause said circuit closing element to be moved into circuit open position to thereby break the circuit in said first mentioned circuit means and thereby effect closing of the valve operated by the solenoid.

3. In an automatic self feeding coffee making apparatus including a hot water reservoir and a coffee making tank therein; a delivery conduit adapted to deliver water from said reservoir into said tank; a self-closing electrically operated valve in said conduit; a first circuit connecting said electrically operated valve to a power source and including a manually closeable start switch, said start switch being adapted to close said first circuit and including a movable lever for opening said start switch; a transformer connected to said first circuit and adapted to be energized thereby; a valve outlet pipe on said tank; an electrical switch device including a fluid pressure operable mechanism including a pressure responsive diaphragm therein adapted to close said electrical switch device and being connected to a low voltage coil of said transformer; a closed path connecting said diaphragm and said tank outlet pipe; a second circuit connected to said electrical switch device and being adapted to be energized by the closure thereof; an electrically operable circuit breaking mechanism being operable by the energization of said second circuit and being adapted to move said lever to thereby open said manually closeable start switch, the rise of liquid in said tank to a predetermined level being adapted to close said electrical switch device to in turn permit energization of said electrically operable switch breaking mechanism to thereby open said manually operable start switch and thereby open said first circuit to de-energise said electrically operated valve to close same and stop delivery of water from said reservoir.

4. In an automatic coffee making apparatus having a hot water reservoir and a coffee brewing tank, a pipe communicating with the upper portion of the reservoir for delivering water to the tank, a self-closing solenoid actuable valve in said pipe; an electric circuit for said solenoid for connection with a power source and having a manually closeable switch in it and support means therefor, said switch including a movable circuit closing element, the closure of said switch being adapted to energize said electric circuit for said solenoid; a relay; a pivotable lever mechanism operably connected to the support means of said manually operable switch and adapted to be pivoted by the energization of said relay to reset said manually operable switch to circuit open position; a fluid pressure operable electric switch including a flexible diaphragm; a low voltage circuit connecting said relay and said fluid pressure operable electric switch; the attainment of a predetermined pressure effected by the volume of liquid in the coffee brewing tank being adapted to flex said diaphragm to cause closing of said low voltage circuit and to energize said relay whereby said lever mechanism will be pivoted to move said circuit closing element and thereby open said manually operable switch to thereby de-energize the solenoid of said valve to permit closing of same.

5. A coffee making apparatus including a hot water reservoir and a coffee brewing tank, a pipe for supplying water to the tank from the reservoir; a normally closed vale in said pipe; a solenoid adapted to operate said valve; a first circuit for the solenoid; a manually closeable switch having a circuit closing element and being adapted to connect the solenoid to a power source; a casing; a closed pipe communicating said casing with the interior of the coffee brewing tank; a fluid pressure responsive diaphragm in said casing communicative with said last mentioned pipe; a manually adjustable switch connected to said casing and having a portion thereof connected to a central portion of said diaphragm; a relay operated mechanism operatively connected to open said manually closeable switch; a second circuit connecting said manually adjustable switch of said casing and the coil of said relay operated mechanism, the rise in pressure in said coffee brewing tank being adapted to flex said diaphragm to cause closing of said manually adjustable switch to thereby cause energization of the coil of said relay to in turn operate said operated mechanism to thereby move said circuit closing element to open said manually closeable start switch and said first circuit.

DONALD F. SWANSON.

REFERENCES CITED

The following references are of record in the file of this patent:

UNITED STATES PATENTS

| Number | Name | Date |
|---|---|---|
| Re. 22,879 | Peters et al. | May 13, 1947 |
| 846,163 | Stubinger | Mar. 5, 1907 |
| 1,506,712 | McAllen | Aug. 26, 1924 |
| 1,508,809 | White | Sept. 16, 1924 |
| 1,634,142 | Hammond | June 28, 1927 |
| 1,822,433 | Brand | Sept. 8, 1931 |
| 1,837,368 | Medin | Dec. 22, 1931 |
| 1,869,720 | Strand et al. | Aug. 21, 1932 |
| 1,887,849 | Pierce | Nov. 15, 1932 |
| 2,029,596 | Smith | Feb. 4, 1936 |
| 2,287,956 | Aff | June 30, 1942 |
| 2,360,194 | Bright | Oct. 10, 1944 |

FOREIGN PATENTS

| Number | Country | Date |
|---|---|---|
| 433,546 | France | Jan. 9, 1912 |